(12) United States Patent
Mauger et al.

(10) Patent No.: US 6,917,586 B1
(45) Date of Patent: Jul. 12, 2005

(54) COMMUNICATION SYSTEM ARCHITECTURE AND OPERATING METHODS THEREOF

(75) Inventors: Roy Harold Mauger, Radlett (GB); Julian Frank Barry Cable, Bishops Stortford (GB); Clive Colin Hayball, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/156,541

(22) Filed: Sep. 17, 1998

(30) Foreign Application Priority Data

Oct. 1, 1997 (GB) ............................................. 9720920

(51) Int. Cl.[7] ......................... G01R 31/08; G06F 11/00; G08C 15/00; H04J 1/16; H04J 3/14; H04L 1/00; H04L 12/26; H04L 12/66
(52) U.S. Cl. ....................................... 370/230; 370/356
(58) Field of Search ................................ 370/352–356, 370/389, 395.1, 395.5, 229–230, 259, 395, 221

(56) References Cited

U.S. PATENT DOCUMENTS

| | | | | |
|---|---|---|---|---|
| 4,782,517 A | * | 11/1988 | Bernardis et al. | 379/201.05 |
| 5,157,663 A | | 10/1992 | Major et al. | |
| 5,434,852 A | * | 7/1995 | La Porta et al. | 370/354 |
| 5,483,527 A | * | 1/1996 | Doshi et al. | 370/352 |
| 5,509,010 A | * | 4/1996 | La Porta et al. | 370/397 |
| 5,732,078 A | * | 3/1998 | Arango | 370/355 |
| 5,956,334 A | * | 9/1999 | Chu et al. | 370/352 |
| 5,991,301 A | * | 11/1999 | Christie | 370/395.1 |
| 6,016,319 A | * | 1/2000 | Kshirsagar et al. | 370/410 |
| 6,031,840 A | * | 2/2000 | Christie et al. | 370/410 |
| H1964 H | * | 6/2001 | Hoffpauir et al. | 370/419 |
| 6,295,293 B1 | * | 9/2001 | Tonnby et al. | 370/389 |
| 6,385,196 B1 | * | 5/2002 | Hayball et al. | 370/356 |

FOREIGN PATENT DOCUMENTS

| | | |
|---|---|---|
| CA | 2161847 | 5/1997 |
| GB | 2309362 | 7/1997 |
| WO | 9629840 | 9/1996 |
| WO | WO 97/24842 | 7/1997 |
| WO | 9728629 | 8/1997 |

OTHER PUBLICATIONS

Singer J et al: "Narrowband Services Over ATM Networks: Evaluation of Trunking Methods", ISS '97. World Telecommunications Congress (International Switching Symposium). Toronto, Sep. 21–26, 1997, vol. 2, Sep. 21, 1997, pp. 17–25.

(Continued)

*Primary Examiner*—Dang Ton
*Assistant Examiner*—Kevin C. Harper
(74) *Attorney, Agent, or Firm*—Barnes & Thornburg LLP

(57) ABSTRACT

To ensure an effective mechanism for disaster recovery, system migration and network enlargement, a communication system (FIG. 6) comprises a narrowband-to-broadband interface (300) having a plurality of network adaptors (302–306) interconnected to a switch (314–316) that provides access to a plurality of virtual channels (318–321) supported by a broadband network. The plurality of network adaptors (302–306) are also coupled to a plurality of trunks (308–312) that each support at least one of a plurality of different communication functions. At least two call servers (324–326) are independently coupled to the narrowband-to-broadband interface (300) and are arranged to control interconnection of trunks to virtual channels, while each of the at least two call servers is responsible for controlling interconnections of group of trunks that share a common communication function within each group. Communication system functionality is therefore separated between the at least two call servers.

13 Claims, 10 Drawing Sheets

OTHER PUBLICATIONS

"Voice and Telephony Over ATM–ATM Trunking Using AAL1 for Narrowband Services Version 1.0" The ATM Forum Technical Committee, 'Online! Jul. 1997.

Underwood DJ: "Using ATM–Based Tandem Switches to Consolidate Narrowband Trunking" ISS '97. World Telecommunications Congress. (International Switching Symposium). Toronto, Sep. 21–26, 1997, vol. 2, Sep. 21, 1997, pp. 27–34.

Singer J et al: "Narrowband Services Over ATM Networks: Evaluation of Trunking Methods", ISS '97, World Telecommunications Congress (International Switching Symposium), Toronto, Sep. 21–26, 1997, vol. 2, Sep. 21, 1997, pp. 17–25.

The ATM Forum Committee: "Voice and Telephony Over ATM–ATM Trunking Using AAL1 for Narrowband Services Version 1.0", 'Online! Jul. 1997, Retrieved from the internet: URL: ftp://ftp.atmforum.com/pub/approved–specs/af–vtoa–0089.000.pdf>.

Underwood DJ: "Using ATM–Based Tandem Switches to Consolidate Narrowband Trunking", ISS '97, World Telecommunications Congress (International Swithcing Symposium), Toronto, Sep. 21–26, 1997, vol. 2, Sep. 21, 1997, pp. 27–34.

Ciurej RF et al: "IP Router Fault Tolerance in the iDen Packet Data System", Motorola Technical Developments, Motorola Inc, Schaumburg, Illinois, US vol. 32, Sep. 1, 1997, pp. 145–150.

"Local Area Network Server Replacement Procedure", IBM Technical Disclosure Bulletin, IBM Corp, New York, U.S., vol. 38, No. 1, 1995, pp. 235–236.

* cited by examiner

COMMUNICATION SYSTEM ARCHITECTURE AND OPERATING METHODS THEREOF

RELATED PATENT APPLICATIONS

The present invention is related to co-pending U.S. patent application Ser. No. 08/907,521 filed on 8 Aug. 1997 in the name of J. F. B. Cable et al. and assigned to Northern Telecom Limited, which co-pending US patent application is further identified by its title "SYSTEM AND METHOD FOR ESTABLISHING A COMMUNICATION CONNECTION" and its international equivalent PCT/GB98/02345.

The present invention is also related to co-pending patent applications us assigned to Northern Telecom Limited and entitled "COMMUNICATION NETWORK HAVING MANAGEMENT SYSTEM ARCHITECTURE SUPPORTING RE-USE", namely U.S. patent application Ser. No. 08/921,218, UK patent application number 9724553.4, European patent application number 98302546.1, Canadian patent application number 2238603 and Japanese patent application number 240385/98.

BACKGROUND TO THE INVENTION

This invention relates, in general, to an architecture for a communication system and its method of operation and is particularly, but not exclusively, applicable to network architectures that both support differing resource capabilities and which combine narrowband call control, services and routing with broadband connectivity.

SUMMARY OF THE PRIOR ART

Globally, telecommunication systems are, generally, in a transitional phase between second generation, narrowband digital networks (such as the Global System for Mobile (GSM) cellular communication system) and future, multimedia digital networks (such as the Universal Mobile Telecommunication System (UMTS)) having broadband capabilities. This transition is necessarily required to support higher data rate communications, including video and internet applications, presently being proposed and made available. Unfortunately, this transitional phase also presents system operators with several dilemmas, and prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be re-implemented for deployment in broadband networks. Consequently, present-day narrowband systems must be adapted to accommodate both narrowband and broadband users; with this statement particularly relevant to service and system management, call establishment and interworking procedures between these different forms of network.

For an effective migration between narrowband and broadband systems (for the transitional phase), system operators must particularly consider an interworking scenario when all subscribers connect to a narrowband network, but one or more intermediate broadband networks are used to relay information between these narrowband subscribers. Any interim solution should also optimise service and system management, while also providing infrastructure equipment that can be re-used in a fully-fledged broadband environment.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another. Routing and relaying functions are therefore core to the development of an efficient system having optimised service capabilities, with operator profits and subscriber service charges inherently entwined with such optimisation.

Taking GSM as an exemplary form of a narrowband digital network, user and control information (or "data") is interleaved, using time division multiplexing (TDM), on a 64 kbit per second (kbps) pulse code modulated (PCM) bearer channel. Indeed, these bearer channels can each be framed to support four voice calls of 16 kbps, comprised from 13 kbps of sampled and encoded speech and 3 kbit/s of ancillary information, such as parity check and correction bits (and the like) and synchronisation information. Data is then relayed across a node by some form of synchronous TDM switching fabric, often of the 'time-space-time' type. Control information (e.g. call set up and tear down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterised in that user and control information is transmitted in fixed or variable length 'packets', with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether. In other words, the broadband ether must accommodate and support narrowband signalling schemes without affecting either data integrity or in any way inhibiting data flow or interconnection. Furthermore, to encourage subscription to broadband services, operators must provide a reliable but relatively low-cost (and hence optimised) communication system architecture.

GB-A-2309362 describes a simple mechanism for the transport of telecommunications traffic across ATM networks. WO 97/28629 relates to an interworking function for carrying SS7 over ATM and WO 96/29840 describes a device arranged to enable voice to be carried over ATM with echo cancellation, voice enhancement and voice compression. These documents merely present a fuller picture of the technical environment in which the instant invention is framed.

SUMMARY OF THE INVENTION

According to a first aspect of the present invention there is provided a communication system comprising: a narrowband-to-broadband interface having a plurality of network adaptors interconnected to at least one switch that provides access to a plurality of virtual channels supported by a broadband network, the plurality of network adaptors further coupled to a plurality of narrowband trunks that each support at least one of a plurality of different communication functions; and at least two call servers independently coupled to the narrowband-to-broadband interface and arranged to control interconnection of a call between a narrowband trunk and a virtual channel of the broadband network, the at least two call servers each responsive to a group of trunks that support common communication functions within each group such that communication system functionality is separated between the at least two call servers.

In a preferred embodiment, the at least two call servers each contain at least one group of trunks that are made up from narrowband trunks distributed across clusters of network adaptor peripherals. The present invention also contemplates that the at least two call servers are responsible for mutually exclusive groups of trunks which beneficially results in a modular system that is easy to maintain and upgrade.

In the event that routing of a call between a narrowband trunk and a virtual channel is independently controllable by either one at least two call servers, then control of the interconnection by a selected one of the call servers is based upon a communication function supported on the narrowband trunk. In this way, an optimum call server is selected.

In order that call servers remain ignorant of any physical change in system interconnection, the preferred embodiment of the present invention further comprises means for mapping logical addresses used by the at least two call servers into physical addresses of network adaptors, wherein the logical addresses are independent of the physical addresses. Indeed, the preferred embodiment comprises means for translating a physical address of a first network adaptor having an associated first logical address into a different physical address of a different network adaptor having the first logical address associated therewith, which translation is recorded and stored in system memory.

In a second aspect of the present invention there is provided a method of deploying a communication system containing: a narrowband-to-broadband interface having a plurality of network adaptors interconnected to at least one switch that provides access to a plurality of virtual channels supported by a broadband network, the plurality of network adaptors further coupled to a plurality of trunks that each support at least one of a plurality of different communication functions; and at least two call servers independently coupled to the narrowband-to-broadband interface and arranged to control the interconnection of calls between narrowband trunks and virtual channels of the broadband network, the method comprising the step of: separating functionality associated with the plurality of network adaptors between call servers whereby each of the at least two call servers is responsible for controlling the interconnection of a group of trunks that share a common communication function.

In another aspect of the present invention there is provided a method of operating a communication system containing: first and second clusters of network adaptors coupled to a broadband network; and a plurality of exchanges coupled to the clusters of network adaptors through a transport network, the plurality of exchanges each having associated call servers responsible for controlling the routing of information between network adaptors and the broadband network and wherein the associated call servers are arranged to support differing communication system functions such that functionality is distributed between at least two call servers; the method comprising the step of: using the first cluster to route the information between the broadband network and a subscriber terminal coupled to a network adaptor in the first cluster; holding the second cluster as a reserve communication resource; detecting a failure of the first cluster wherein routing of the information between the subscriber terminal and the broadband network is inhibited; and reconfiguring the transport network to cross-connect the subscriber terminal to the broadband network via the second cluster to reestablish routing of the information between the subscriber terminal and the broadband network.

In a further aspect of the present invention there is provided a method of upgrading system software in a communication system containing at least two call servers coupled to a plurality of narrowband-to-broadband interfaces that connect narrowband trunks to virtual channels of a broadband network, the at least two call servers being independently capable of supporting differing communication system functions, the method comprising the steps of: initially using a first call server to run system software that administers connection of the narrowband trunks to the virtual channels; loading a software upgrade into a second call server; re-routing a subset of narrowband trunks from the first call server to the second call server; running the software upgrade on the second call server in an attempt to connect the subset of narrowband trunks to the virtual channels, the step of running occurring in tandem with a continued use of the first call server to administer the connection of narrowband trunks to virtual channels; and assessing the effectiveness of the software upgrade in relation to communication system functionality.

Advantageously, the present invention provides a communication system architecture that optimises the provision of services while providing an ability to produce a modular, flexible and scaleable system that can be quickly adapted to both improve system reliability and enhance overall system performance. Indeed, the present invention allows distribution of infrastructure components across a network, while maintaining a telecommunications network as standards compliant.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

There are, apparently, two principal ways of implementing the interconnection of narrowband subscribers units through an intermediate broadband network, such as an asynchronous transmission mode (ATM) architecture; either an interworking function can be implemented at each boundary between the narrowband and broadband networks (in which a dedicated and reversible coding transposition is applied to the respective narrowband/broadband information), or narrowband information can be encapsulated over a broadband subnet whereby the narrowband information is packaged with a broadband frame structure (so entirely maintaining the integrity and format of the original encoded narrowband information). In relation to user information, e.g. encoded speech or specific data traffic, it has been identified that both the interworking function and encapsulation mechanisms are possible and merely represent an additional process step that complicates and extends the requirements for coding within communication systems, generally. However, in relation to control information (which is required to establish and maintain a connection), there are a number of penalties and benefits associated with both of the above approaches. Specifically, encapsulation allows existing services to be supported, even though these services may not independently be sustained by the broadband network. Furthermore, encapsulation is simple to implement. On the other hand, interworking requires only a local view at each interworking point (i.e. at the narrowband/broadband boundary), and also provides a mechanism that can support the participation of narrowband and broadband subscribers in a single call.

Figure 1:
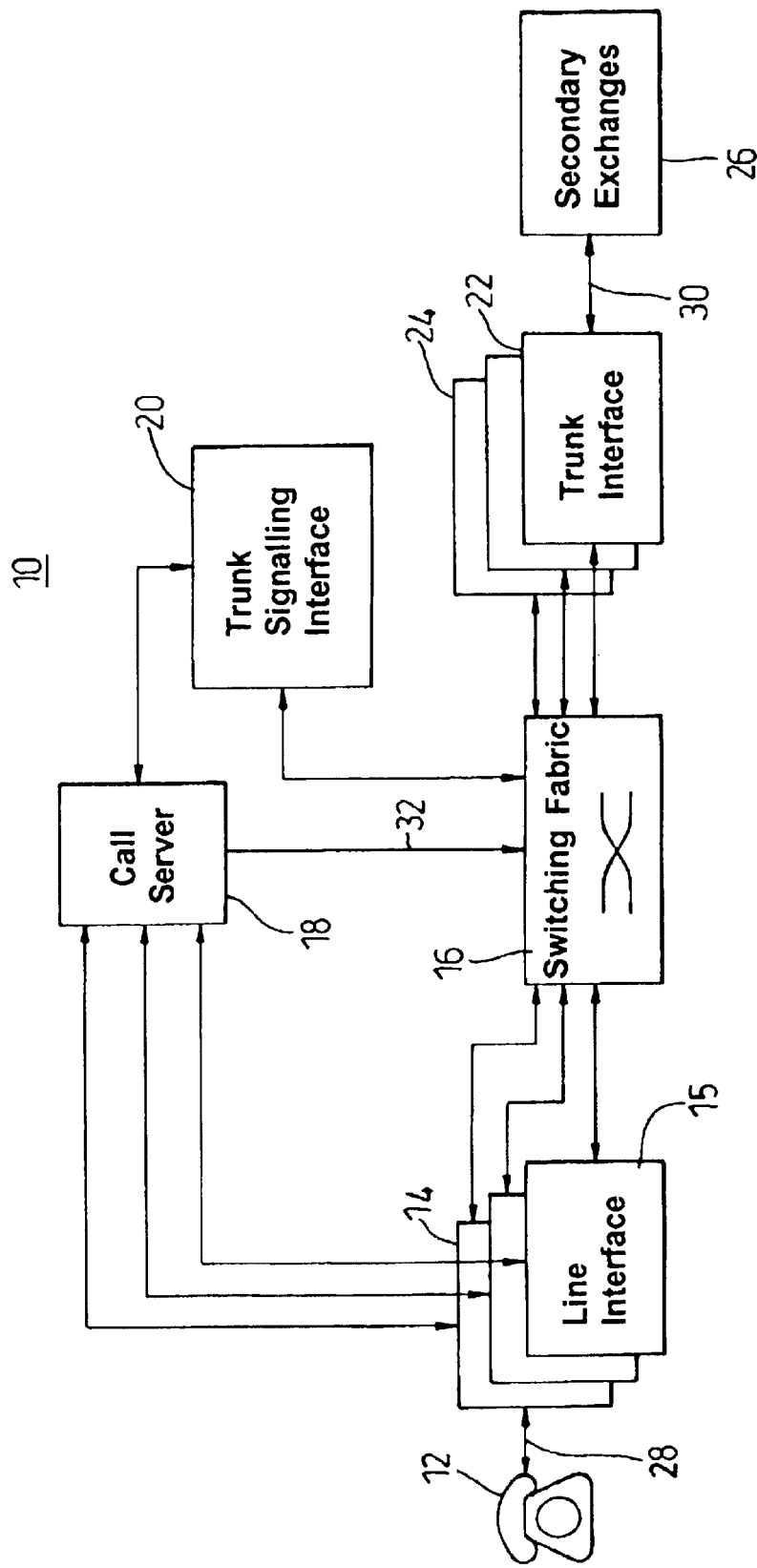
FIG. 1 is a block diagram illustrating an abstract model of a narrowband communication node.

Referring to FIG. 1, a block diagram illustrating an abstract model of a narrowband communication node 10 is shown. A number of subscriber terminals 12, such as landline telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network 10. The call server 18 is further coupled to the switching fabric 16. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces are further coupled to secondary exchanges 26, such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
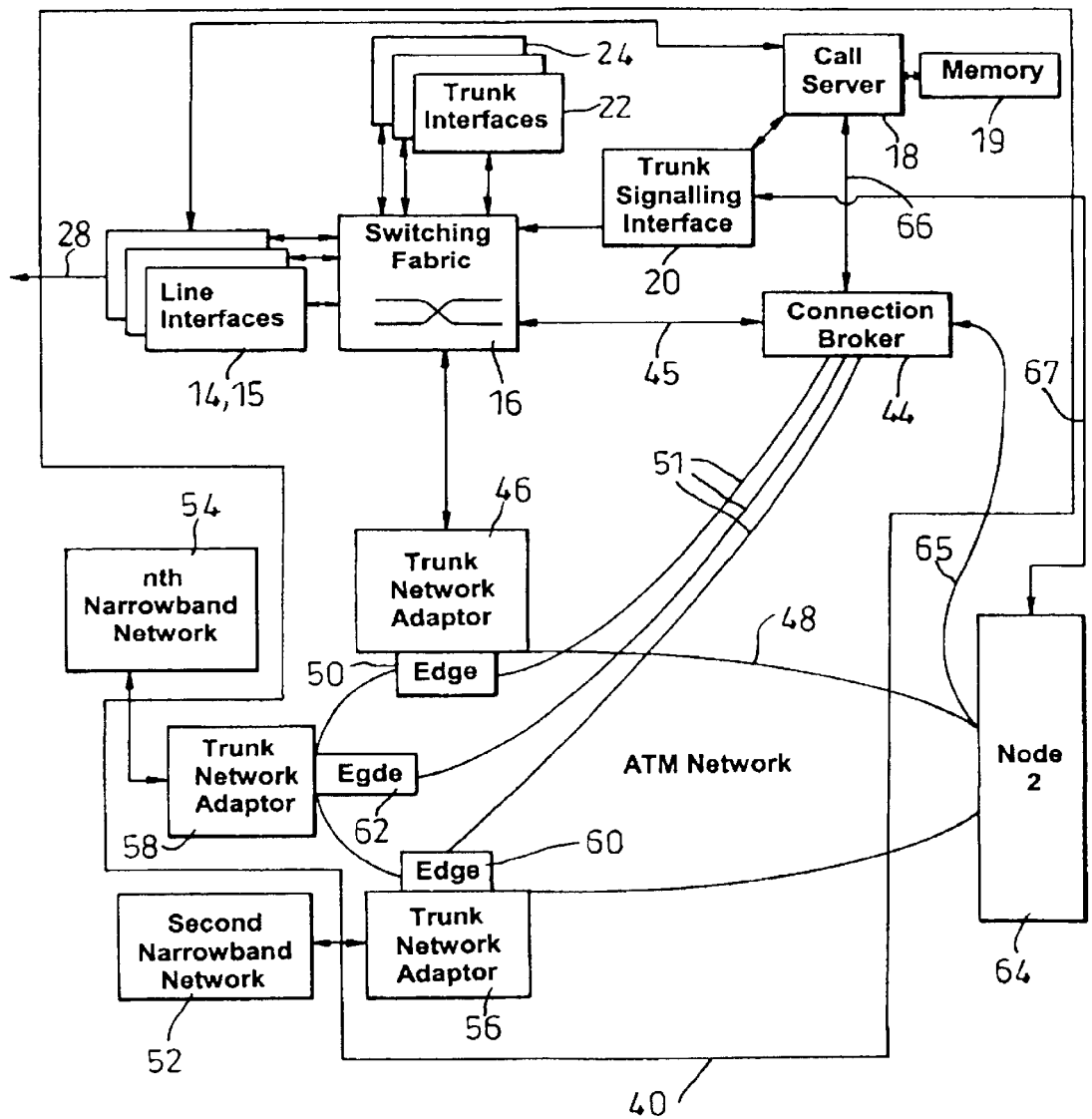
FIG. 2 is a block diagram illustrating an underlying principle for subscriber terminal interconnection between narrowband and broadband networks, as required in the present invention.

Turning now to FIG. 2, there is shown a block diagram illustrating an underlying principle for subscriber terminal interconnection between narrowband and broadband networks, as required in the present invention. In this figure, a broadband network is used to transport the user and/or control information. To facilitate an understanding of the architectural differences between the conventional narrowband network of FIG. 1 and the broadband network adjunct that interconnects narrowband networks, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network. The call server is coupled to a memory that is arranged to store, amongst other things, circuit indicators codes (CICs) associated with both real trunks and "phantom trunks"; the purpose of the latter will be described subsequently. More particularly, the memory can record a "busy" or "vacant" status against each of these real or phantom trunks. The call server 18 is further coupled to a connection broker 44, which in turn is coupled to the switching fabric 18 via bus 45. The connection broker 44 represents a first departure in the system architecture of the present invention from the conventional narrowband network FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of, trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adapter 46 that allows interconnection and interoperability of the narrowband network with a broadband network 48 implemented, for example, for asynchronous transmission mode (ATM) operation. More particularly, interconnection of the trunk network adapter 46 is through a broadband network edge switch 50, that is coupled to and hence controlled by the connection broker 44 by control lines 51. The combined function of the trunk network adapter 46 and the broadband network edge switch 50 will be described subsequently. Other narrowband networks 52–54 are coupled, in a similar fashion, to the broadband network 48 via respective trunk network adapters 58–60 and broadband network edge switches 60–62. As will be appreciated, other narrowband networks 52–54 will be realised through infrastructure architectures similar to that described immediately above.

The broadband network 48 is further coupled to a second node 64, typically a different network, which is also responsive to the connection broker 44 via connection 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrowband networks operated by different operators.

Narrowband signalling within the communication system, generally, is controlled by the call server 18, while broadband signalling, i.e. signalling that may be sent between different narrowband networks 52–54 via the intermediate broadband network 48, is controlled by the connection broker 44. Consequently, the call server 18 is not concerned with broadband signalling interconnection and operation.

The narrowband line interfaces 14–15, trunk interfaces 22–24 and switching fabric 16 are supplemented by a broadband network 48 and trunk (i.e. narrowband/broadband) network adapters 46, 56–58 that act to provide gateway functionality. Specifically, the trunk network adapters 46, 56–58 perform traffic (user information) interworking functions and signalling (control information) encapsulation, with the signalling ultimately relayed back to a call server 18.

The function performed by the connection broker 44 is used to provide a uniform connection abstraction 66 for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 45), and therefore acts transparently in order to appear identical in function to the prior art narrowband network of FIG. 1. The switching fabric 16 of the narrowband network then establishes the connection in accordance with known techniques, and does not utilise the broadband network 48. For a broadband to broadband connection, the connection broker 44 instructs the broadband network and/or trunk network adapters 46, 56–58 to make or break a call connection, and therefore mimics standard broadband operation.

For a narrowband to broadband connection, however, both actions must be performed contemporaneously. Specifically, the connection broker 44 both instructs the switching fabric 16, through the call server 18 in the narrowband network, to hold open a routing path for a call and negotiates with a trunk network adapter 46 of the broadband network for the allocation of a suitable channel resource. Once both paths have been determined, the connection broker 44 sends dedicated messages to the switching fabric 16 and the trunk network adapter 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, each typically having switchable narrowband/broadband capabilities and defined service capabilities. However, intermediate broadband networks may not be able to support these services (or any service of similar nature) nor be to interpret narrowband control channel signalling required to set-up a defined narrowband services, i.e. there are different signalling protocols between the different adjacent exchanges. In th is case, the interconnection of the narrowband networks (through the intermediate broadband network 48) requires the functional coordination of separate call servers and connection brokers located in the respective networks.

Figure 3:
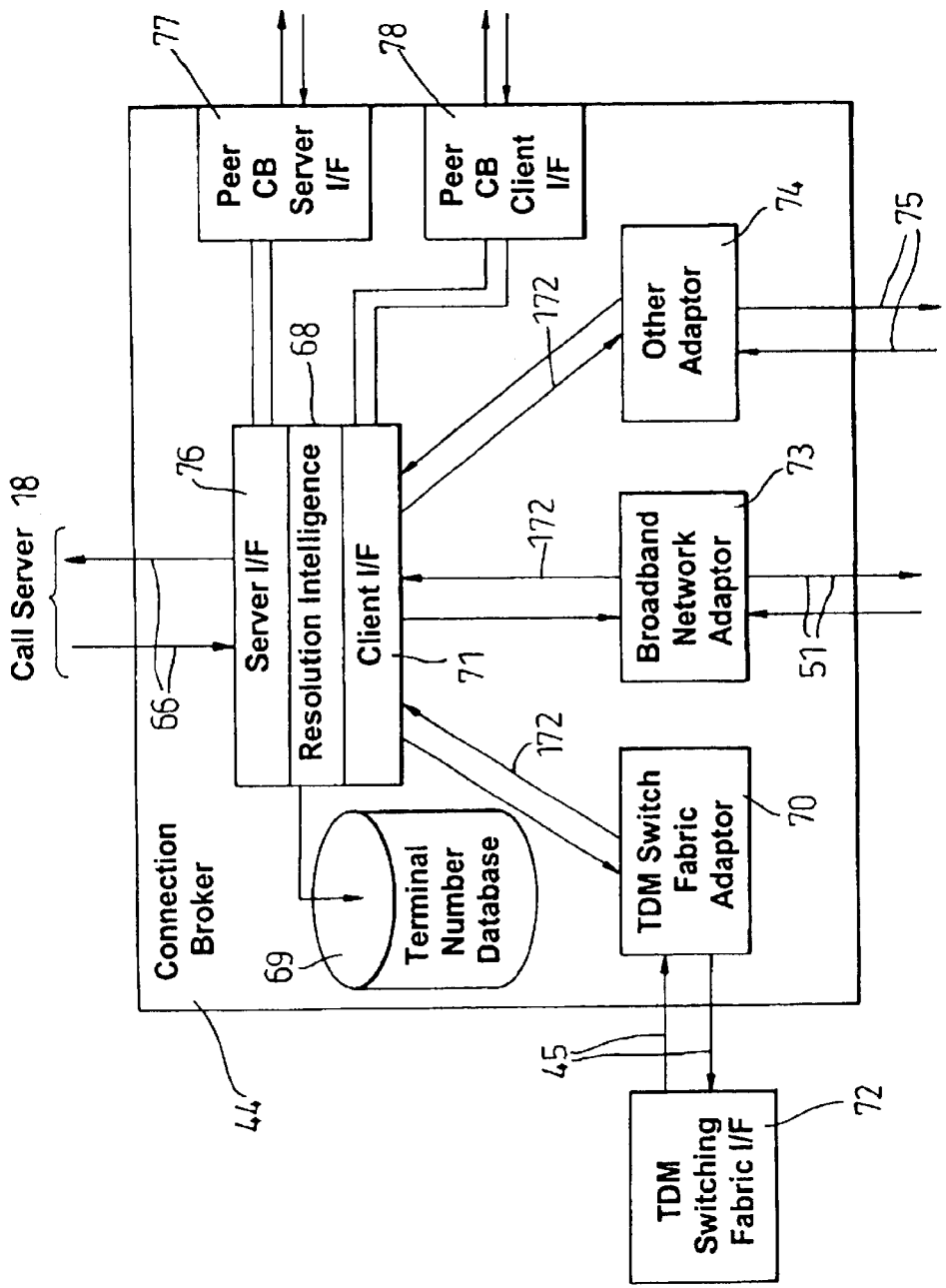
FIG. 3 illustrates an abstract architecture for a connection broker of FIG. 2.

Turning to FIG. 3, an abstract architecture for the connection broker 44 of FIG. 2 is shown. Although a hardware implementation is dependent upon (and hence deter min ed by) specific requirements, a typical implementation extends the capabilities of an existing, narrowband telephone exchange. By way of example and explanation only, the connection broker 44 of FIG. 3 contains resolution intelligence 68 that is "typically realised by a control processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adapter 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 72 is utilised between the resolution intelligence 68 and the TDM switching fabric adapter 70, although this need not be the case. A broadband network adapter 73 is also coupled through the client interface port 71 to the resolution intelligence 68, with communication between the resolution intelligence 68 and broadband network adapter 73 typically based on the dedicated connection protocol 72. The broadband network adapter is analogous to the trunk network adapter 46 of FIG. 2. Other adapters 74 for ancillary networks or services may also be coupled to the resolution intelligence 68 via the client interface 71. The broadband network adapter 73 and the other adapters 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

The connection broker 44 of FIG. 3 supports a set of real-time processes within a single fault tolerant processor, i.e. within the resolution intelligence 68. The inter-processor communications facility (supported by the dedicated connection protocols 72) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adapters. However, as communication networks evolve to be more broadband-orientated, the call server 18 and connection broker 44 may reside on processors with only broadband interfaces that are connected directly to the broadband network 48. The narrowband connection fabric would then be provided with a broadband control interface.

Figure 4:
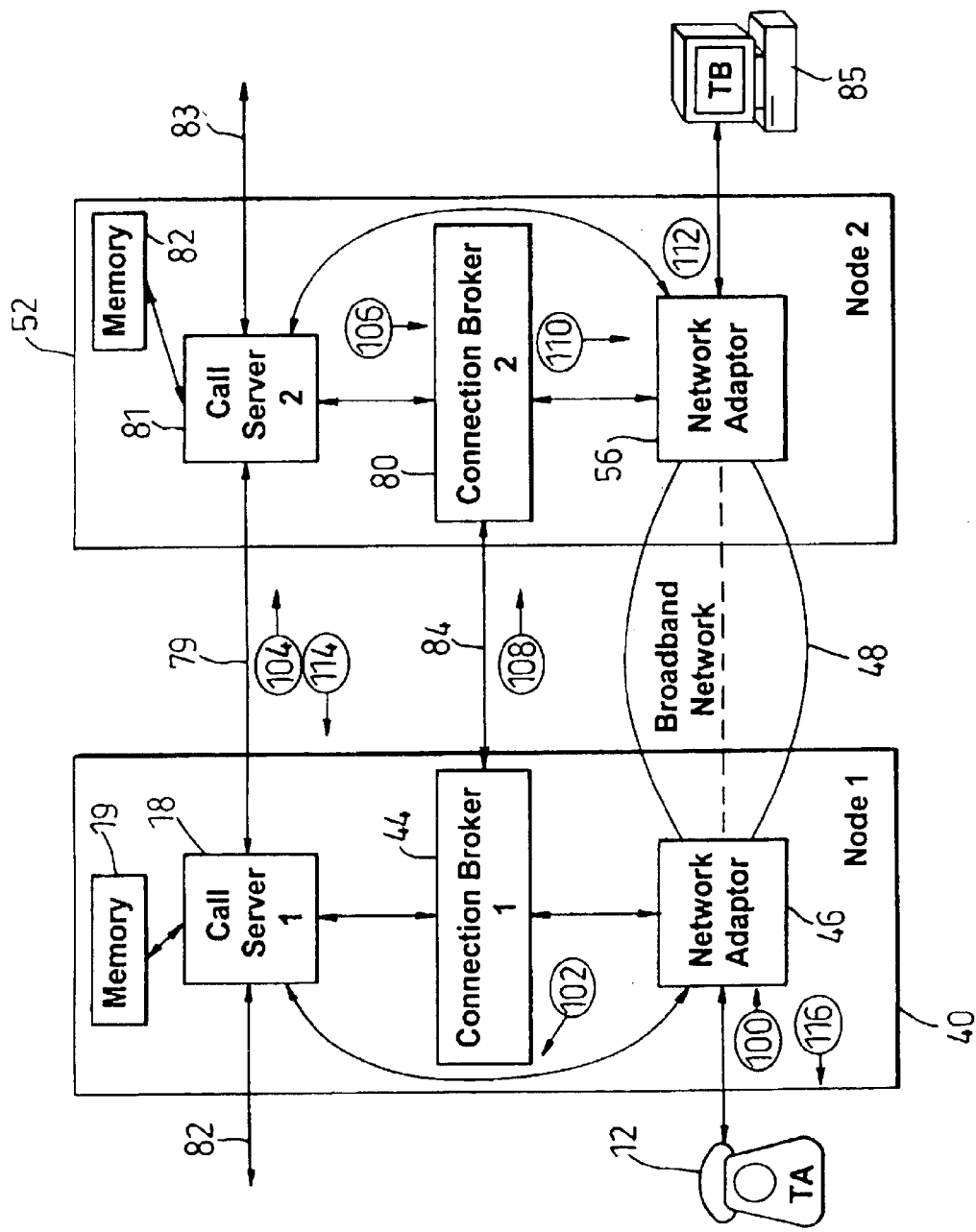
FIG. 4 is a representation of a system architecture and associated mechanism by which subscriber terminals can be connected across an intermediate broadband network.

A system architecture and associated mechanism for connecting subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, an existing common signalling relation between both narrowband nodes is utilised. It is the establishment of a common narrowband signalling link (or resource) 79 and protocol that provides interconnection across the system since the broadband network need only have the capability of relaying traffic between the narrowband networks. The broadband network consequently appears as a transparent channel resource since no modification of the narrowband traffic is required.

The first node 40 and the second node 52 both contain trunk network adapters 46 and 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80 that in turn are coupled to respective trunk network adapters 46 and 56. The trunk network adapters 46 and 56 are coupled together through a broadband network 48, while the connection brokers 44 and 80 are interconnected by a virtual link 84. Terminal TA 12 is coupled to trunk network adapter 46, while terminal TB 85 is coupled to trunk network adapter 56.

The signalling link 79 is realised a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection brokers 44 and 80 offers a permanent "ability to communicate". The virtual link 84 therefore takes the form of an ATM virtual channel connection. However, it is also possible for an SS7 network to be used as the bearer for this communication, e.g. in relation to a TCAP application. The communication links between the connection brokers 44 and 80 and both the network adapters 46, 56 and the switching fabrics are also permanent, while connections that carry traffic between the network adapters 46, 56 and the interconnected subscriber terminals TA 12, 85 are made and broken for the duration of a specific call or for particular portions of those calls.

This system operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. These phantom trunks are dedicated to a single node and, as such, the system only allows the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

Figure 5:
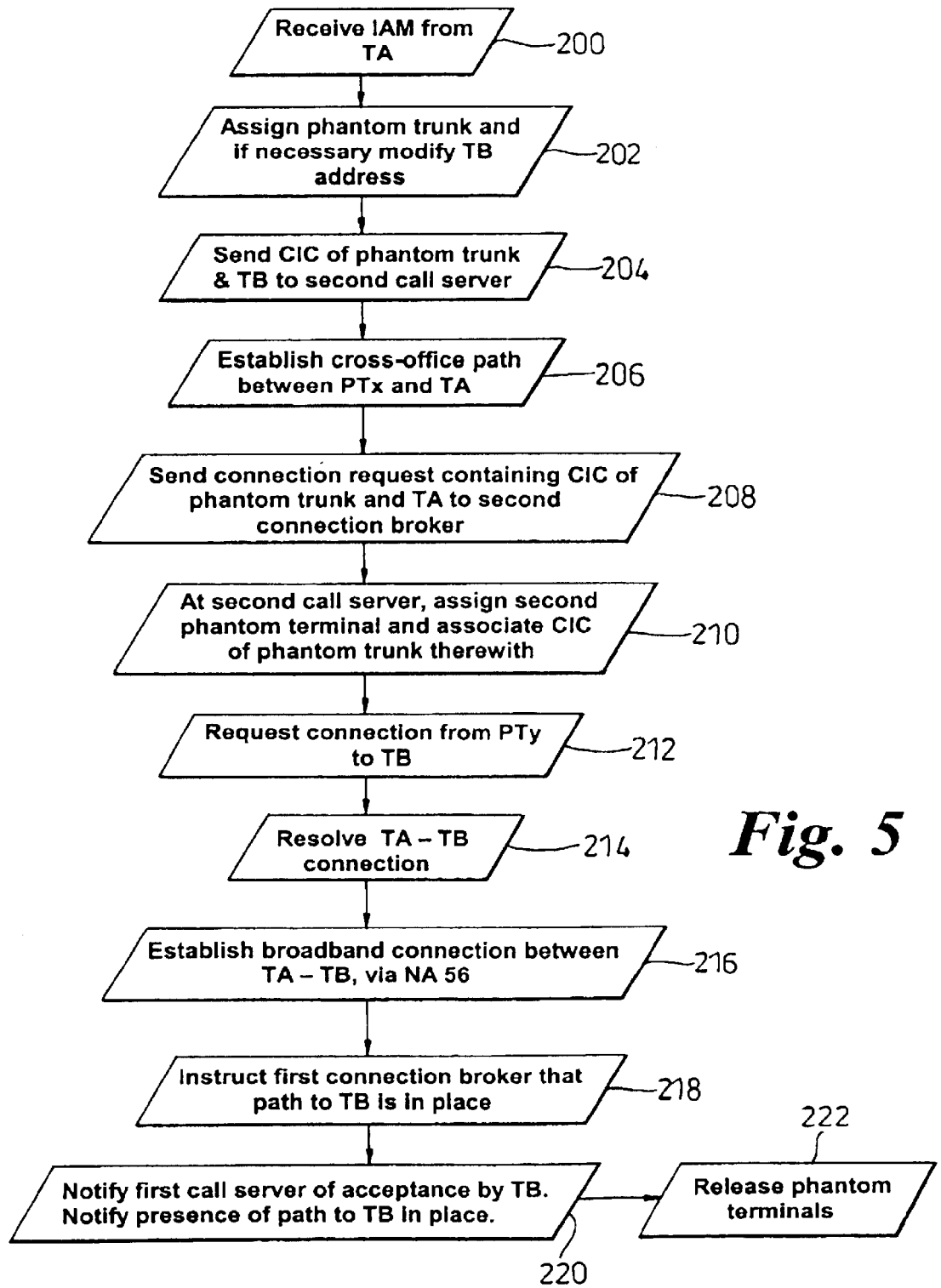
FIG. 5 is a flow diagram illustrating the procedural steps required in the present invention to establish a multi-node communication across a broadband network.

In relation to the structure, content and function of call set-up messages between different exchanges (i.e. different nodes), this can best be understood with reference to FIG. 4 and the flow diagram of FIG. 5 that illustrates the procedural steps required to establish a multi-node communication across a broadband network.

An incoming call (or "initial address message", IAM) from terminal TA is received 200 at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish 202 a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay 204 a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish 206 a phantom cross-office path between PTx and TA, with information pertaining to this cross-office path typically stored in the terminal number data base 69 by the resolution intelligence 68. In other words, terminal TA is coupled to phantom terminal PTx. Also, the first connection broker 44 is triggered into action by the communication of the modified call message (to the second call server 81).

Specifically, substantially contemporaneously with the sending of the modified call message, the first connection broker 44 of the first node 40 notes that the phantom terminal PTx is one end of an outgoing phantom trunk to the second node 52. The first connection broker therefore passes 208 a connection request 106 to the second connection broker 80 via virtual link 84, which connection request contains the CIC of the phantom trunk and the identity of TA (possibly derived from the original CIC assigned to the trunk between TA and the first call server 18). Typically, the actual address of the call-originating unit, i.e. TA, is sent.

The second node 52 reacts to the modified incoming call message (received on the phantom trunk) by mapping 210 the received circuit indicator code (CIC) of the phantom trunk onto an associated second phantom terminal PTy. Again, the second phantom terminal PTy has been selected by the second call server 81 of the second node 52 from its associated memory 82, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests 212 a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out 214 the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection 216 between TA and TB via the second trunk network adapter 56. At about the same time, the second connection broker 80 (of the second node 52) instructs 218 the first connection broker 44 (of the first node 40) that the path to TB is in place.

Acceptance by the terminal TB of the call, and confirmation of the connection by the second call broker 80 is notified from the second call server 81 to the first call server 18, and the first connection broker 44 also notifies 116 its associated call server 18 that the path to TB is in place. At this point 220, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

As will be understood, an exemplary address format for each phantom terminal is typically arranged to be a special case of the format used for real (i.e. physical rather than imaginary) terminals. An ASN.1 Object Identifier can be used to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for establishing a phantom trunk is for the connection broker to appropriately tag and record (in the terminal number data base 69) such a phantom trunk as either incoming or outgoing.

Turning again to the general architecture of FIG. 2, an ATM network and the International Telecommunications Union, Telecommunications Section (ITU-T) signalling system No. 7 an be utilised to implement the broadband network and narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adapter 46 connected to an Asynchronous Transfer Mode (ATM) network 48. The trunk network adapter 46 translates bearer channels to an ATM scheme, with a one-to-one relationship existing between each bearer channel and an ATM virtual channel (VC). Typically, the broadband network edge switches 50, 60–62 and hence the trunk network adapters 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adapters 46, 56–58 using the proxy signalling option of UNI 4.0.

Narrowband signalling to other exchanges can use either existing narrowband connections or can be routed via network adapters (e.g. 46, 58) and the broadband network using either circuit emulation or frame forwarding. The concept is applicable to both fully and quasi-associated signalling schemes. Connections to another mixed mode node are implemented in a similar fashion.

As will now be understood, the connection broker 44 passes narrowband-to-narrowband requests to the narrowband switching fabric 16, while broadband-to-broadband connections (within the same node) are established using proxy signalling to set-up the connection directly. For narrowband-to-broadband connections, two requests are needed; one to the narrowband switching fabric 16 and one to the broadband network edge switches 50, 60, 62. However; for a broadband-to-phantom terminal connection, the connection broker passes the connection request to the second connection broker (reference numeral 70 of FIG. 3) at the other end of the phantom route. The connection is then made by using a proxy signalling scheme emanating from the second connection broker 70. It should be noted that the present invention envisages that the phantom terminals are implemented as broadband terminals, and so a narrowband-to-phantom terminal connection is handled as a combination of a narrowband-to-broadband connection and a broadband-to-phantom terminal connection.

It will also be appreciated that the service inter-working function is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 68.

The connection mechanism outlined above therefore provides for the interconnection of mixed nodes through an intermediate broadband network which is otherwise unable to interpret and therefore unable to support the control channel signalling protocols separately utilised within the narrowband networks. Such operation could be supported, for example, by a modified trunk network adapter (of a broadband network) equipped with narrowband signalling software, but generally occurs between different infrastructure exchanges. Consequently, by employing this mechanism to establish a common control channel, the modified trunk network adapter can support a narrowband traffic resource to participate in narrowband services without requiring the intervention of a signalling interworking function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, this system is scaleable to arbitrarily complex networks and which can operate over any underlying connection fabric including TDM, ATM or Frame Relay.

Figure 6:
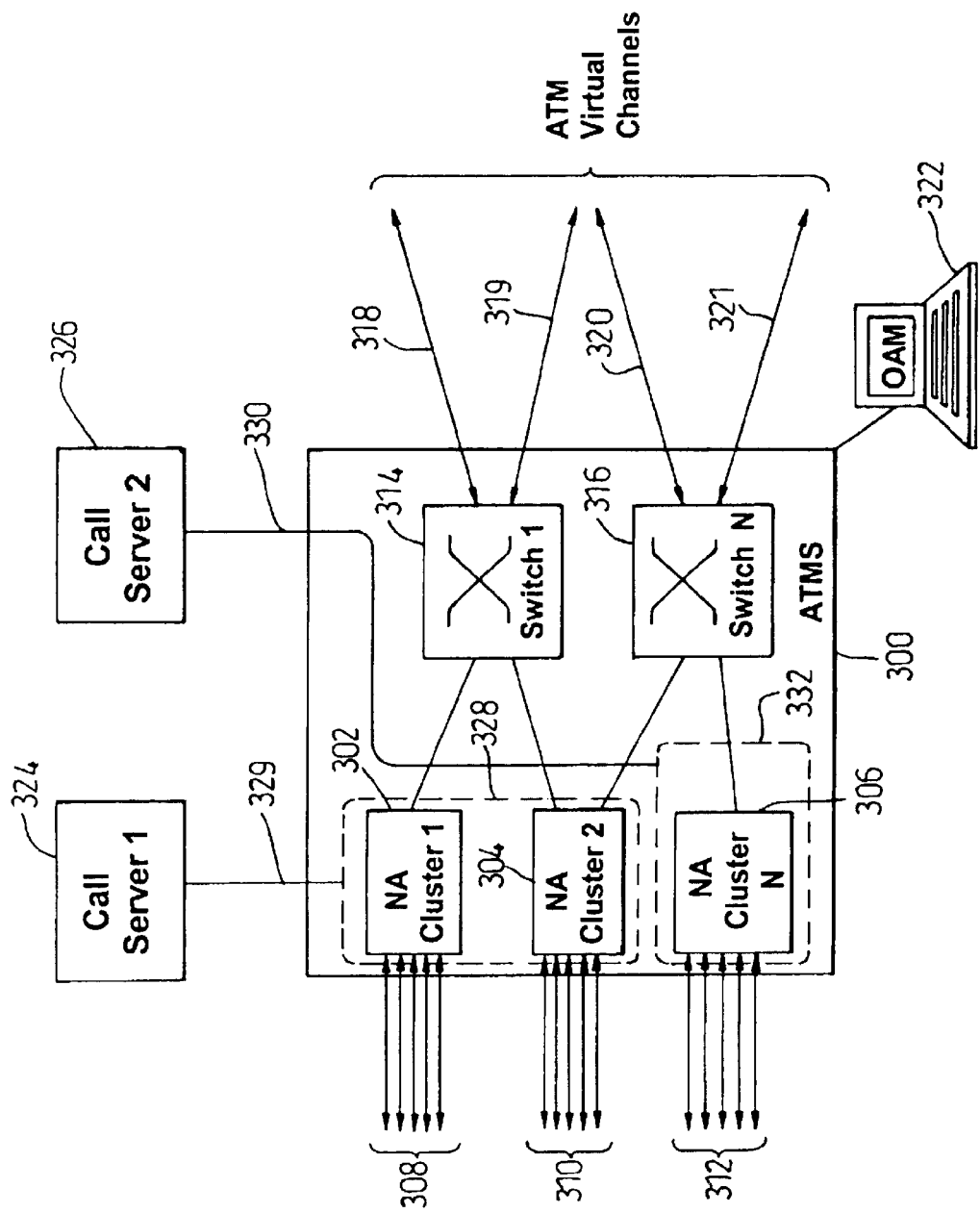
FIG. 6 is a block diagram of a communication system architecture according to a preferred embodiment of the present invention.

Now, according to the present invention, enhanced functionality can be provided to the basic communication system architecture of FIGS. 2 and 4 by adapting the communication system architecture in accordance with FIG. 6 (that shows a virtual ATM node constructed according to a preferred embodiment of the present invention). Implementation of the preferred embodiment of FIG. 6 advantageously optimises the provision of services while providing an ability to produce a modularised, flexible and scaleable system that can be quickly adapted to both improve system reliability and enhance overall system performance. Indeed, the present invention allows distribution of infrastructure components across a network, while maintaining a telecommunications network as standards compliant.

In FIG. 6, an ATM system (ATMS) 300 contains a plurality of network adaptor (NA) clusters 302–306. The plurality of NA clusters 302–306 can be distributed throughout the communication network (i.e. NA clusters do not need to be co-located), while each NA cluster 302–306 contains a number of network adaptors. In relation to each NA cluster 302–306, a plurality of incident trunks 308–312 illustrate an interconnection of each solitary NA in each cluster to at least one subscriber terminal, such as a landline modem or telephone (and probably via an intermediate narrowband exchange). Furthermore, the ATMS 300 typically includes a plurality of broadband switches 314–316 (only two of which are shown for the sake of clarity), which broadband switches 314–316 are each coupled to at least one NA cluster 302–306. As such, calls that appear on trunks incident to each NA in each NA cluster can be routed via a broadband switch to a selected one of a plurality of ATM virtual channels 318–321 that interconnect each broadband switch to a suitable broadband network. Typically, the ATMS 300 is coupled to an operations and maintenance centre (OAM) 322 that functions to run diagnostics and maintenance operations on the ATMS 300.

Although not shown, the ATMS 300 will also contain connection brokers arranged to facilitate interconnection of calls between mixed nodes, as previously described.

Located externally to the ATMS 300 are a plurality of call servers 324–326. The term "call server" can also be freely substituted for the term "distributed processor platform", with the latter term merely providing a more descriptive label of the function performed by that particular piece of infrastructure. Each of the call servers 324–326 is responsible (and hence coupled to) at least one of the NA clusters 302–306 of the ATMS 300. For example, a first call server 324 may control the operation and interconnection of (two) NA clusters 302–304, while a second call server 326 controls the operation of a third NA cluster 306. Moreover, the functional control exerted by the distinct call servers may extend to individual NAs of predetermined subsets within each NA cluster 302–306 or, in fact, to individual incident trunks that are coupled to each NA in each NA cluster. In other words, narrowband trunks that are incident to a single NA cluster may be administered by different call servers, or the functional control of identified subsets of narrowband trunks (distributed throughout the network) may be administered by more than one call server.

In the preferred embodiment, each call server may also be responsible for the control (and hence the assignment) of subsets of ATM virtual channels 318–321, whereby only certain ATM virtual channels are accessible by each call server.

Therefore, the first call server 324 (which may be responsible for a first subset of NAs 328) has an interface 329 to the ATMS 300 that appears as a virtual view with respect to the ATMS 300. Similarly the second call server 326 has an interface 330 that also appears virtual in nature with respect to a second subset containing third NA cluster 306. Consequently, the systems architecture of FIG. 6 allows the physical separation of individual NAs and/or NA clusters within the communication network that is independent of a separate partitioning of functionality associated with individual trunks or groups of trunks incidental to each NA cluster. The communication architecture of the preferred embodiment of the present invention is therefore able to support different virtual ATMS views. Every call server that is coupled to an ATMS 300 can control operation and interconnection of discrete and distinct services (i.e. there is a partitioning of services between each distributed processor platform). In other words, the preferred embodiment of the present invention, both in an operational and structure sense, provides a physical and functional separation of trunks 308–312 and ATMS virtual circuits 318–321.

The virtual ATMS of the present invention therefore has call servers that control sets of narrowband trunks (and possibly ATM virtual channels), but which call servers are arranged not to see the physical NAS, NA clusters or ATM switches.

As will be appreciated, a functional separation of services could be on a voice, compressed voice, or multi-media services basis. Furthermore, it will be appreciated that NAs could also be shared between call servers, such that a call on a trunk is selectably routable to at least one of two available call servers.

Deployment of a plurality of call servers 324–326 in relation to each ATMS provides a number of benefits and advantages. Specifically, the distributed ATMS architecture of the preferred embodiment of the present invention is comprised of sub-systems that are heterogeneous in nature (because NAs are fundamentally different in character to ATMS switches), which sub-systems are therefore independently evolvable. As such, the present invention is scaleable to meet possible future bandwidth requirements of real time video and other multimedia services required by future public networks. Additionally, the distributed nature of the architecture of the preferred embodiment separates service intelligence, call control and network interconnection into separate functions connected by standard open interfaces (notwithstanding that a set of implementation independent services may be composed from interconnected, co-operating entities). The present invention is also able to improve upon current network performance and reliability because the ATMS 300 can be extended in a modular and scaleable manner to address issues arising from capacity overload. The preferred embodiment of the present invention further reduces total costs per call (associated with capital expenditure, feature deployment and operation) by separating concerns between the connection fabric and the service platform, and by using modern high-density programmable hardware implementations. More specifically, by separating concerns, the ATMS allows services to be implemented on either a traditional digital narrowband network 380 (such as a DMS manufactured by Nortel) or multiple call servers that interwork over the ATMS to reduce feature deployment costs.

Ultimately, the ATMS of the preferred embodiment of the present invention contains structures that divide into entities at a level of replaceable modules (either implemented in terms of hardware or software or a combination thereof). In this way, the system is freely extendible and is capable of being quickly maintained, extended or repaired.

Figure 7:
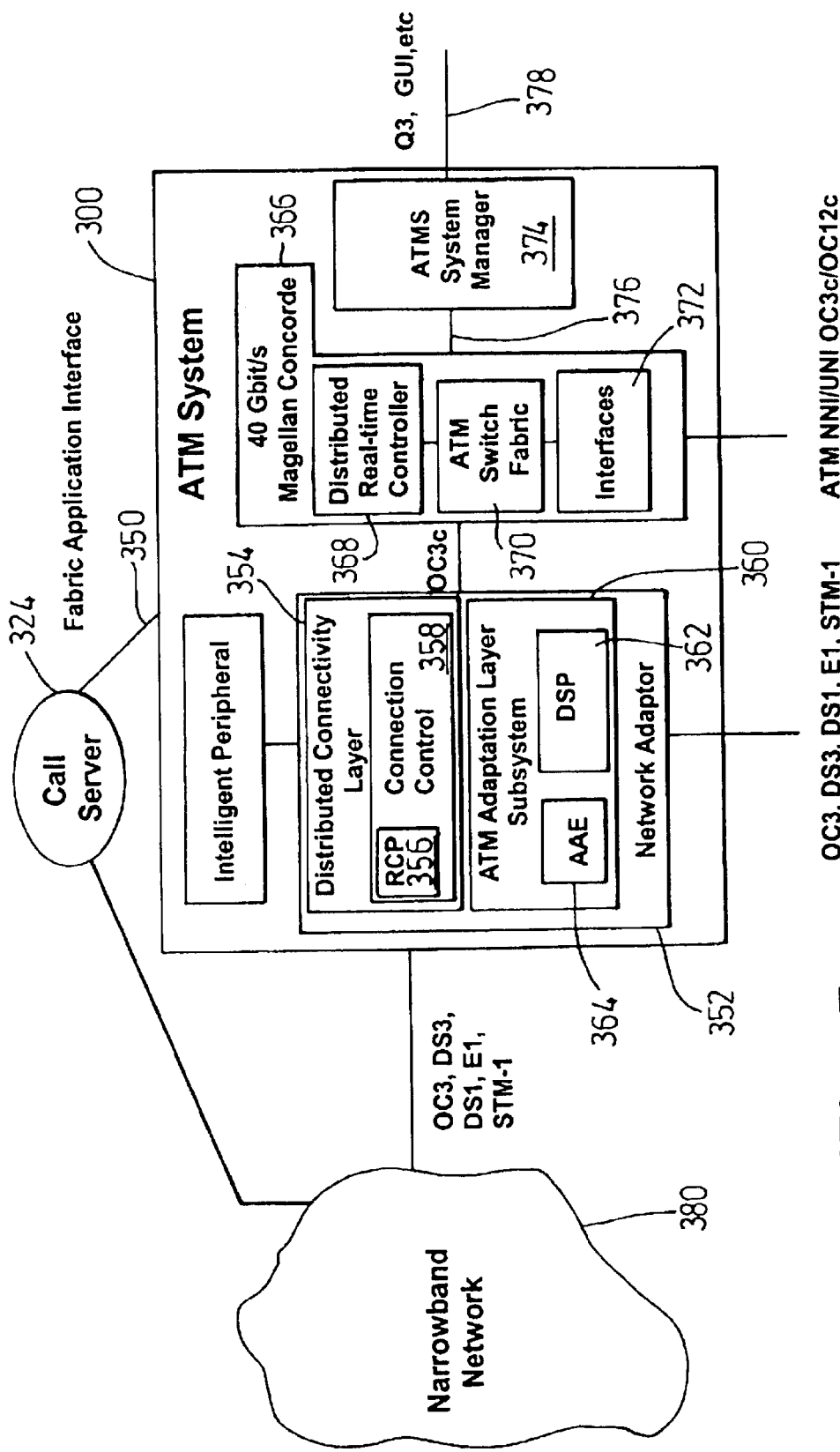
FIG. 7 is represents a more detailed block diagram of FIG. 6.

FIG. 7 represents a more detailed block diagram of FIG. 6. The ATMS 300 can be seen to be coupled to a call server through a fabric application interface (FAI) 350. A network adaptor (or network adaptor) 352 typically includes a distributed connectivity layer 354 having a real time compute platform (RCP) 356 associated with a connection control processor 358. Additionally, the network adaptor 352 includes an ATM adaptation layer sub-system 360 comprising a digital signal processor (DSP) 362 and access adaptor equipment (ME) 364.

Coupled to the distributed connectivity layer 354 is an ATM call switch 366, such as a 40 gigabit per second (Gbps) Magellan concord switch, having a distributed real time controller 368, an ATM switch fabric 370 and ATM interface 372. Typically, the ATM switch 366 is coupled to the NA 352 through an OC3c connection. An ATMS system manager 374 is also coupled to the ATMS call switch 366 through a broadband connection 376. The ATMS system manager 374 of the ATMS 300 can then be coupled to other ATMS systems or appropriate networks via a Q3, GUI or equivalent communication signalling resource 378, while the switch is coupled to the broadband network via ATM NNI/UNI OC3/OC12C signalling line; the latter function performed by the network edge switches of FIG. 2. The function and purpose of the ATMS system manager 374 will be described subsequently.

The network adaptor 352 is coupled to the narrowband network (such as a DMS) 380, typically through an OC3, DS3, DS1, E1 or STM-1 communication resource. The DMS 380 is further coupled to the call server 324.

As previously indicated, each NA cluster 302–306 is a group of NAs together with real time compute platforms that act as fabric application interface servers for the group of trunks incident to the NA cluster. A pair of RCPs support a NA cluster of about twenty thousand to thirty thousand trunks. Each NA cluster 302–306 is therefore an independent product interworking with similar products through the ATM network, with all communication between the RCPs and the NAs via the ATM. Therefore, the structure of the preferred embodiment of the present invention allows for NAs within a cluster to be physically separated and therefore not co-located.

In order to implement the advantageous structure of the present invention, the fabric application interface 350 has a logical circuit address constructed from NSAP (network service access point) identities, with this logical circuit address being independent of the physical equipment identities used to identify an individual trunk circuit (or "DS0") within a NA. This physical separation allows a virtual ATMS view to be presented to the call server and thus support powerful evolution and disaster recovery. More specifically, the ATMS translates the NSAP logical circuit addresses into corresponding physical equipment identities using a pre-provisioned look-up table (such as stored in the terminal number data base 69 of the connection broker of FIG. 3).

By implementing a fabric application interface on Q.2931 signalling using NSAP identities to provide circuit address identifiers, a call server is able to operate the ATMS 300 as a switching fabric making requests of the form "connect circuit address A to circuit address B". The ATMS 300 does not therefore need to be aware of routes required for the interconnection, neither does it need to be involved in signalling because these functions are performed by the call server.

The ATMS system manager 374 is a multi-platform management system consisting of client and server platforms. Server platforms execute the required management functionality, while client platforms (also termed "desktop platforms") provide man-machine interfaces. In small systems, a single server/desktop platform can be employed. More especially, the ATMS system manager 374 provides remote surveillance and fault analysis, whereby maintenance personnel can be dispatched to perform corrective actions. The ATMS system manager 374 also provides a secure repository of information relating to the management of ATMS nodes and/or networks, as will be appreciated.

Each ATMS network is therefore comprised of logical ATMS nodes in the form of virtual ATMSs, which nodes (from a management perspective) offer management functionality irrespective of how they are physically realised. In order to support the concept of a virtual ATMS and to provide integrated management of ATMS nodes, the ATMS management system makes a clear distinction between management of the functionality offered by the ATMS from the management of the equipment that offers that functionality. Two management models can then be considered, namely those provided by: 1) an ATMS logical "black-box" model that describes a node's managed functionality independently of how this functionality is realised in terms of physical equipment; and 2) an ATMS physical "white-box" model that describes how the node is realised in terms of its physical equipment and interconnectivity.

The logical black-box model includes details on ATMS node external interfaces, e.g. sonet, ATM and FAI. The black-box model also identifies both nodal routing information (such as addresses for ATMS nodes), logical addresses of trunk circuits, and details of embedded signalling channels (e.g. Channel Associated Signalling, Robbed-Bit Signalling and Common Channel Signalling).

The physical white-box model includes information pertaining to the composition of the node in terms of NAs, compute platforms and ATM switches. Indeed, the physical white-box usually identifies information down to a level of replaceable units with dedicated identities, version types and physical locations, for example. The white-box model also identifies the physical connectivity within the node and logical connectivity information (such as internal control and traffic virtual circuit identities), and also includes indications concerning sparing policies, sparing groups and the allocation of "instances" to compute servers.

The objects and functionality managed between these two models is associated by means of special relationships that indicate how the logical entities are realised by their physical counterparts. These associations therefore support management functionality, such as flow-through provisioning and service impact analysis, that spans the models.

With respect to the implementation of mechanisms that realise management techniques for these special relationships, the following co-pending applications (that are incorporated herein by reference) describe techniques by which logical to physical mapping tables in the virtual ATMS can be provisioned and changed to effect the recovery mechanisms described in some of the different aspects of the present invention: 1) U.S. patent application Ser. No. 08/08/921,218 filed on 27 Aug. 1997 in the name of C. C. Hayball et al. and assigned to Northern Telecom Limited, which co-pending US patent application is equivalent to EP 98302546.1 and is further identified by its title "COMMUNICATIONS NETWORK HAVING MANAGEMENT SYSTEM ARCHITECTURE SUPPORTING RE-USE"; 2) U.S. patent application Ser. No. 08/918,895 [Applicant's reference ID0806] filed on 27 Aug. 1997 in the name of C. C. Hayball et al. and assigned to Northern Telecom Limited, which co-pending US patent application is equivalent to EP 98303396.0 and is further identified by its title " "MANAGEMENT SYSTEM ARCHITECTURE AND CONSTRUCTION METHOD TO SUPPORT RE-USE"; 3) U.S. patent application Ser. No. 08/921,649 [Applicant's reference ID0807] filed on 27 Aug. 1997 in the name of C. C. Hayball et al. and assigned to Northern Telecom Limited, which co-pending US patent application is equivalent to EP 98302614.7 and is further identified by its title "MANAGEMENT SYSTEM ARCHITECTURE AND DESIGN METHOD TO SUPPORT RE-USE"; and 4) U.S. patent application Ser. No. 08/921,225 [Applicant's reference ID0808] filed on 27 Aug. 1997 in the name of C. C. Hayball et al. and assigned to Northern Telecom Limited, which co-pending US patent application is equivalent to GB 9724548.4 and is further identified by its title "COMMUNICATIONS NETWORK HAVING MANAGEMENT SYSTEM ARCHITECTURE AND DESIGN METHOD TO SUPPORT RE-USE".

The ATMS manager itself is managed as a logical entity separate from any particular ATMS node, while the physical and functional partitioning is fundamental to the way in which the ATMS management is itself structured.

As will now be understood, the fabric application interface 350 comprises a number of virtual circuits providing a load sharing pool of virtual ATMS blocks (sometimes referred to as "instances"). Each NA cluster has a pair of RCPs that operate as active/active with a mutual active/standby operation. Each RCP instance is configured with one of the virtual ATMS virtual channels. Therefore, in the event of an RCP failure, the virtual channel is re-configured to the other RCP of the pair. This form of operation makes a resilience model of the ATMS invisible to the call server and vice versa. Each RCP also has an instance of a connection broker that provides the virtual ATMS image as well as a number of processes for supported TDM trunks and phantom trunks, as will now be understood.

A NA cluster may form part of more than one virtual ATMS. In this case, the RCP will contain more than one connection broker and the RCP pair will have dual load sharing ATMS virtual channels coupled to each of the call servers that operate as virtual ATMS instances with respect to the NA cluster in question.

Figure 8:
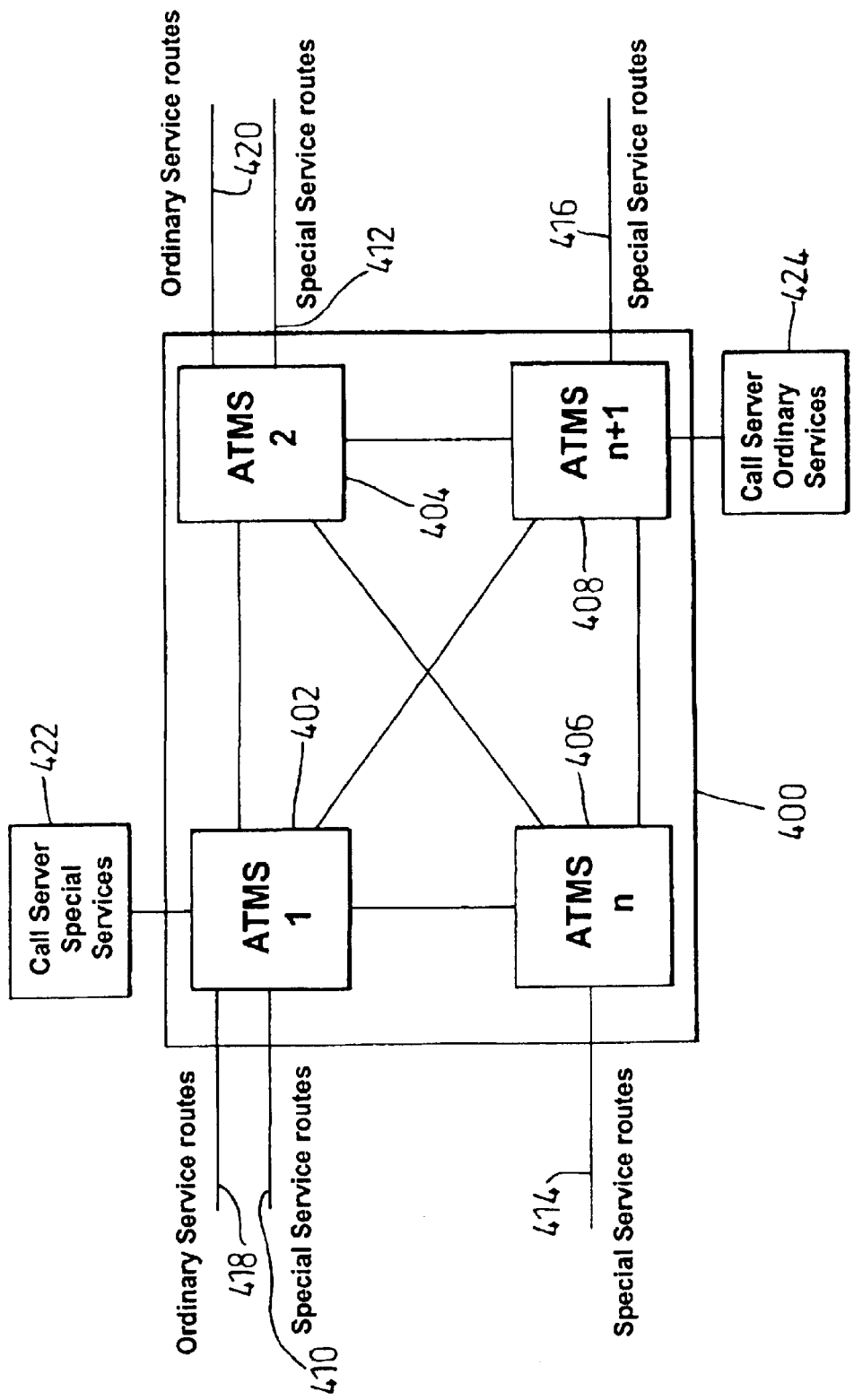
FIG. 8 demonstrates the provision of a virtual overlay network for special service operation, as derived from the communication system architecture of FIG. 6.

The configuration of FIG. 6 also enables a special service operation to be configured as a virtual overlay network; this is illustrated in FIG. 8. Special service routes can be segregated and configured on many geographically distributed ATMSs. A special service call server can be configured in one or more physical locations and can be presented with one or more special service virtual ATMSs. This allows the opportunity to support a number of parallel call server developments and to roll out trial services offered by an operator on a flexible mix and match basis.

Specifically, with reference to FIG. 8, a communication network 400 contains a plurality of interconnected ATMSs 402–408. The interconnection of each ATMS is such as to allow, in the preferred embodiment, a direct connection of one ATMS to any other ATMS. All of the AMTSs have special service routes 410–416 coupled thereto, while at least some of the AMTSs (e.g. ATMS 1 and ATMS 2) of the network 400 also have ordinary service routes 418–420 coupled thereto. In relation to control of the network 400, at least two distributed processing points 422–424 are coupled to the network; one call server is assigned specifically to control special services while another call server is assigned to control ordinary services. In relation to the exemplary structural arrangement of FIG. 8, the call server associated with providing control of special services (reference numeral 422) is coupled directly to ATMS 1 (reference numeral 402), while call server associated with providing control of ordinary services (reference numeral 424) is coupled directly to ATMS (N+1), i.e. the call server having reference numeral 408.

Figure 9:
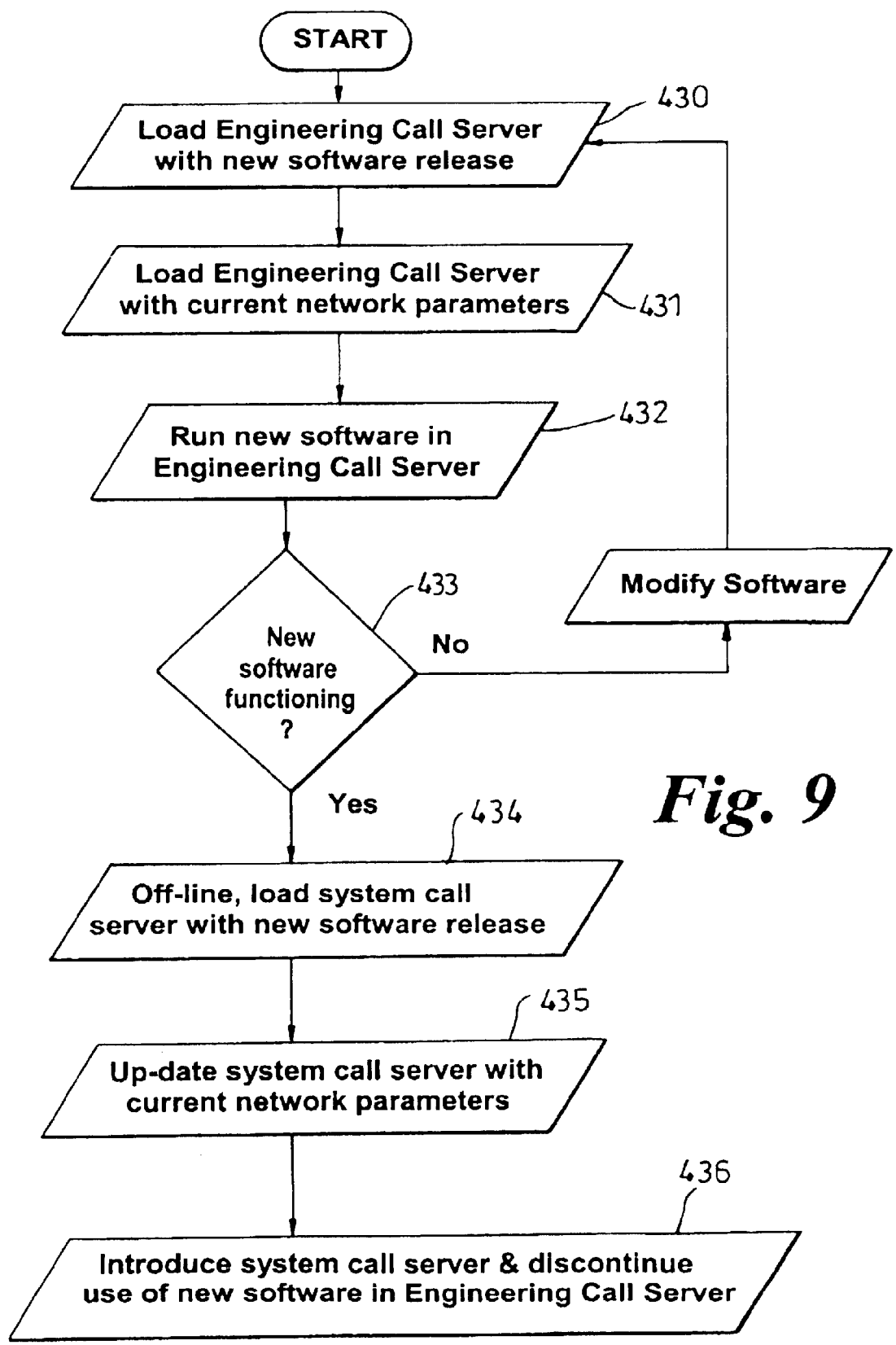
FIG. 9 is a flow diagram detailing software upgrade of a call server of FIG. 8.

Another advantage provided by the system architecture of FIG. 6 is an ability to migrate from one software release to another without impacting network service. FIG. 9 is a flow diagram detailing software upgrade of the call server of FIG. 8.

As a consequence of the fabric application interface 350 being based on ATM connectivity, it is now relatively straightforward for a network operator to extend the ATMS to support simultaneous connectivity of active and standby virtual ATMS. Specifically, a call server configuration can be dedicated to service network engineering purposes and this can be loaded with a new software release (step 430 of FIG. 9). At an appropriate point in time, this engineering call server can receive a copy of current network data (step 431) from an active and distinct call server which therefore readies the ATMS for a flash-cut software release. Following the software release, the different ATMSs therefore provide both a standby virtual ATMS to the current call server and an active virtual ATMS to the new release software on the engineering call server. The new release software is therefore able to run in tandem (step 432 of FIG. 9) for some predetermined period of time to ensure satisfactory operation (step 433) prior to disconnection of the standby virtual ATMS (step 434) and the current call server being upgraded off-line to the new release (steps 435–436).

More particularly, the engineering call server is likely to be loaded with the new software release and then brought on-line by having a subset of narrowband trunks (typically proprietary to the network operator who owns the engineering call server) re-routed to the engineering call server. Then, during software assessment, more trunks can gradually be routed to the engineering call server as test phases are completed satisfactorily.

Therefore, in the event that a fault is detected in the new software release, no damage is caused to the system since the active virtual ATMS retains and continues to operate with the original software code.

It will be appreciated that the architecture of FIG. 8 supports this software upgrade mechanism which consequently provides a substantial improvement over current upgrade scenarios where switch processor systems run in a split mode in order to acquire and load network data. Indeed, the split mode upgrading is often run overnight and nevertheless presents a considerable risk to a network operator because any failure could result in total switch failure and network shutdown.

The system configuration provided by the present invention also aids in disaster recovery scenarios where there has been a total failure of any of the elements in the ATMS. In fact, disaster recovery performed by the system of the preferred embodiment of the present invention is particularly effective because systems components are each equally susceptible to effective recovery since the structure of the present invention recovers an environment that enables call handling to be re-established. In contrast, however, system duplication schemes of the prior art are often ineffective because of the requirement for network operator involvement in saving stable calls.

Figure 10:
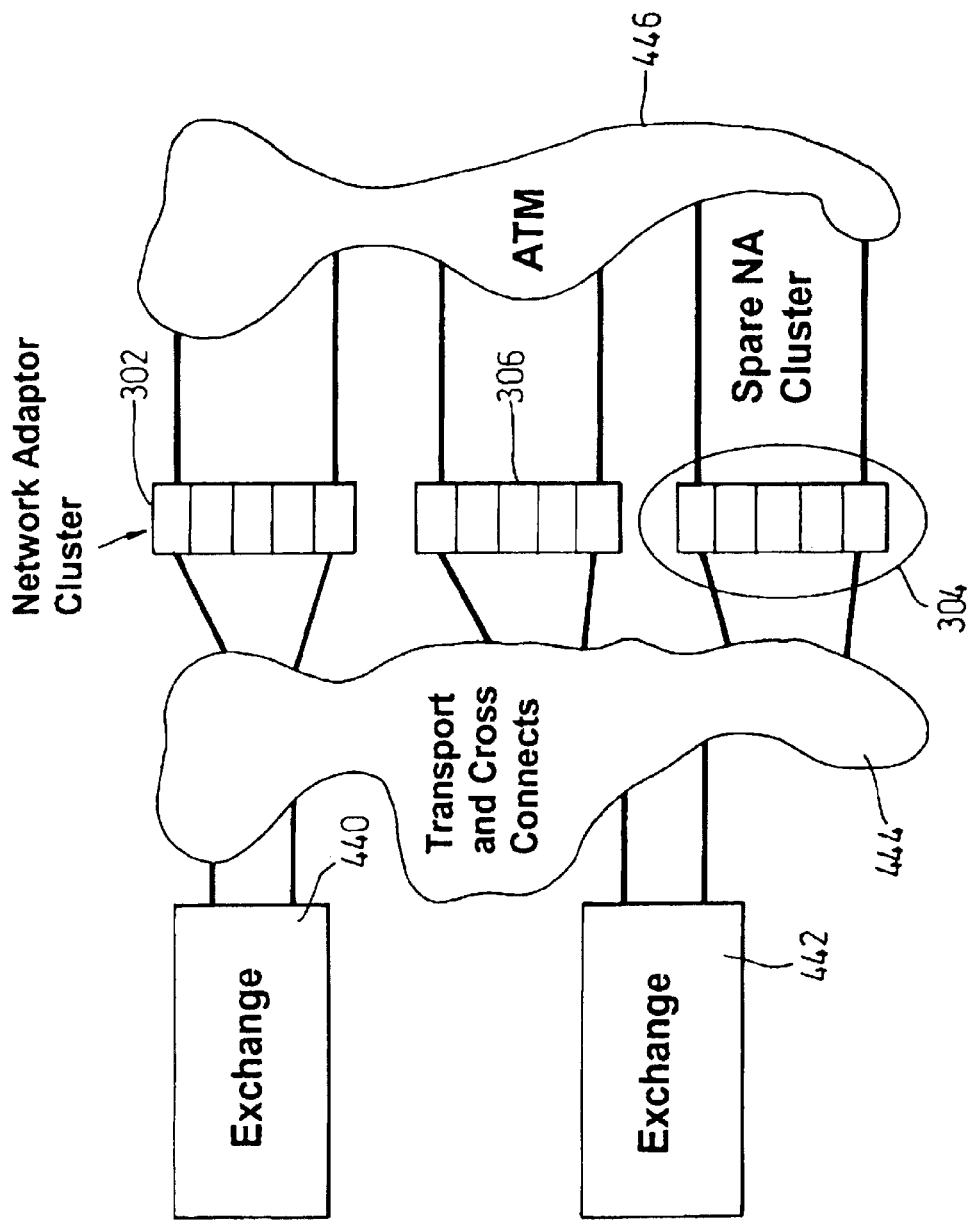
FIG. 10 is a block diagram illustrating the interconnection and redundancy of network adaptors through a transport network, as envisaged by a preferred embodiment of the present invention.

Specifically, with reference to FIG. 10, if a connection between NA clusters 302–306 and exchanges (i.e. ATMSs) 440–442 is via a transport network 444 having cross-connect capabilities, failure of a NA cluster (e.g. NA cluster 306) can be recovered by reconfiguring transport links to cross-connect to a standby NA cluster, e.g. NA cluster 304. The virtual ATM concept of the present invention then allows trunks to be reconfigured to the standby NA cluster in a manner transparent to the call server. Specifically, the ATMS system manager effects ATMS reconfiguration by re-linking managed objects in the virtual ATMS (black-box model) of the present invention to new counterparts in the ATMS equipment (white-box) model. This re-linking has the effect of triggering actions that bring into service the spare NAs together with any new connection brokers, and also reconfiguring the terminal number database 69 to reflect the new logical to physical translations. Typically, the resolution intelligence 68 of FIG. 3 (or some other system processor) oversees the updating of the terminal number database 69. A dedicated management channel between the ATMS and call server is used to advise the call server of which connection brokers are now available, while the NSAP addresses used by the call server to effect connection set-up are unaffected by these system changes. The logical definition of the virtual ATMS therefore remains unchanged, albeit that the call server is now physically coupled to a different NA (or cluster). Therefore, traffic can be easily and effectively re-routed via any standby NA cluster.

As described above, an interface between each NA cluster and an ATM core 446 is provided by a standard transport mechanism, such as synchronous digital hierarchies. This therefore allows NA clusters to be deployed remotely from the ATM core 446 which in turn assists in mitigating the effects of system failures arising from disasters, such as fire, flood and earthquake.

Furthermore, since a relationship between a NA cluster (or group of NAs) and a virtual ATMS is independent of the connectivity relationship of the NA cluster with the ATM core, the preferred embodiment of the present invention provides an ability to connect an external physical route that is split over NAs connected to different ATM cores. Failure of the ATM core (or ATM core switch, such as ATMS switch 336 of FIG. 7) will cause a loss of traffic capability on a route through that core, but routes will not be completely disconnected. Specifically, dual homing of a NA to two ATM cores and over-provisioning the ATM core capacity (i.e. the supply of redundant routes) can be implemented for critical routes, whereby ATM core disaster has no effect on traffic.

In a similar vein to proving software upgrades, the provision of a secondary call server to each ATMS ensures that call server failure can be addressed by selectively switching between available call servers.

Finally, in relation to ATMS system manager failure, the distribution of the operational control of the system over many platforms ensures that a specific failure does not crash the entire network and only effects the equipment associated with the failed AMTS system manager platform. Any failed ATMS system manager platform can then be recovered off-line through either its internal maintenance procedures or by servicing, such that full operation of the system can be recovered in an acceptable period of time.

In summary, by providing a flexible mapping between a circuit address, as seen by the call server, and a physical service circuit address of a NA within an equipment bay, the preferred embodiment of the present invention allows a physical (real) ATMS 300 to appear as a virtual ATMS. Moreover, an image of a virtual AMTS presented to the call server can be derived from multiple NAs or (NA clusters) distributed over multiple atm core systems, thus allowing scalability, service evolution and disaster recovery capabilities.

What is claimed is:

1. A communication system comprising:
a narrowband to broadband interface having a plurality of network adaptors arranged into a plurality of clusters supporting associated communication functions and each interconnected to at one switch that provides access to a plurality of virtual channels supported by a broadband network, the plurality of network adaptors being further coupled to a plurality of narrowband trunks that each support at least one of a plurality of different communication functions; and
at least two call servers each containing at least one mutually exclusive group of trunks and each independently coupled to the narrowband to broadband interface and arranged to control interconnection of a call between a narrowband trunk and a virtual channel of the broadband network, the at least two call servers being responsive to a group of trunks that support common communication functions within each group such that communication system functionality is separated between the at least two call servers; and a plurality of geographically distributed narrowband-to-broadband interfaces interconnected by a broadband network;
wherein the plurality of network adaptors are distributed across the communication system;
wherein interconnection of a call on a narrowband trunk is independently controlled by either of the at least two call servers;
wherein one of the call servers is selected to control the interconnection of the call based on a single communication function supported by the narrowband trunk;
wherein the group of trunks contain trunks that are incident to a plurality of network adaptor clusters; and
wherein the at least two call servers include:
a first call server arranged to administer the control of a first group of communication services within the communication system and between the plurality of geographically distributed narrowband-to broadband interfaces; and
a second call server arranged to administer the control of a second group of communication services within the communication system and between the plurality of geographically distributed narrowband-to broadband interfaces.

2. The communication system of claim 1, wherein the first call server is an active system control device and the second call server is a standby system control device that is selectively operational to support communication system functionality.

3. The communication system of claim 2, wherein the second group of communication services contain trial services and wherein the first group of communication services contain current subscriber service supported by the communication system.

4. The communication system of claim 3, wherein the at least two call servers have associated virtual channels.

5. The communication system of claim 3, wherein the associated virtual channels are uniquely assigned to individual call servers.

6. The communication system of claim 5, further comprising means for mapping logical addresses used by the at least two call servers into physical addresses of network adaptors, when the logical addresses are independent of the physical addresses.

7. The communication system of claim 6, further comprising means for translating a physical address first network adaptor having an associated first logical address into a different physical address of a different network adaptor having the first logical address associated therewith.

8. The communication system of claim 7, further comprising a memory for storing mapping relationships between the logical address and the physical address.

9. The communication system of claim 8, wherein the logical address is a network service access point identity.

10. The communication system of claim 9, wherein the physical address is an individual trunk circuit identity.

11. The communication system of claim 10, further comprising a fabric application interface coupled between the at least two call servers and the narrowband-to-broadband interface, the at least two call servers arranged to communicate logical addresses to the narrowband-to-broadband interface via the fabric application interface.

12. The communication system of claim 6, wherein the physical addresses are individual narrowband trunks.

13. A method of deploying a communication system comprising a narrowband to broadband interface, the method comprising the steps of:

providing a plurality of network adaptors distributed across the communication system;

arranging said network adaptors into a plurality of clusters supporting associated communication functions and each interconnected to at least one switch that provides access to a plurality of virtual channels supported by a broadband network;

coupling the plurality of network adaptors to a plurality of narrowband trunks that each support at least one of a plurality of different communication functions; and providing at least two call servers, each containing at least one mutually exclusive group of trunks and each independently coupled to the narrowband to broadband interface and arranged to control interconnection of a call between a narrowband trunk and a virtual channel of the broadband network, the at least two call servers being responsive to a group of trunks that support common communication functions within each group such that communication system functionality is separated between the at least two call servers; and distributing geographically a plurality of narrowband-to-broadband interfaces interconnected by a broadband network;

using either of the at least two call servers to independently control interconnection of a call on a narrowband trunk;

selecting one of the call servers to control the interconnection of the call based on a single communication function supported by the narrowband trunk;

providing that the group of trunks contain trunks that are incident to a plurality of network adaptor clusters; and arranging the at least two call servers to include:

a first call server arranged to administer the control of a first group of communication services within the communication system and between the plurality of geographically distributed narrowband-to broadband interfaces; and a second call server arranged to administer the control of a second group of communication services within the communication system and between the plurality of geographically distributed narrowband-to broadband interfaces.

* * * * *